July 2, 1929.　　　V. VALLETTA　　　1,719,032
CHANGE SPEED GEAR
Filed April 19, 1928
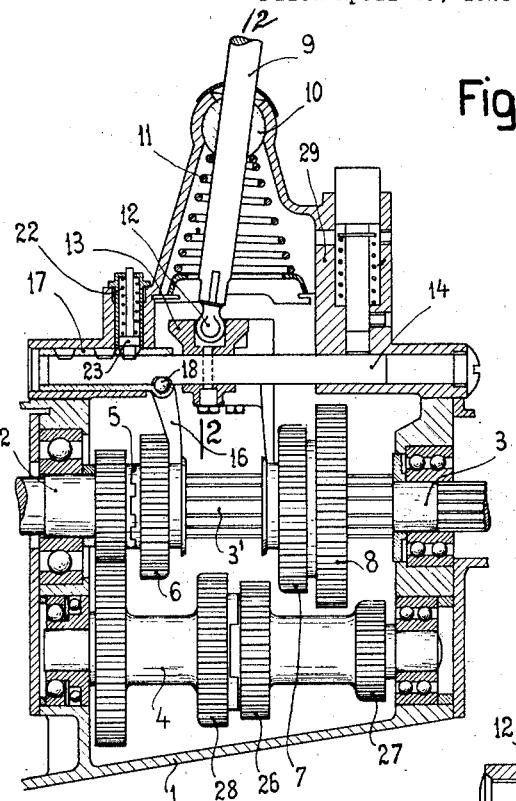
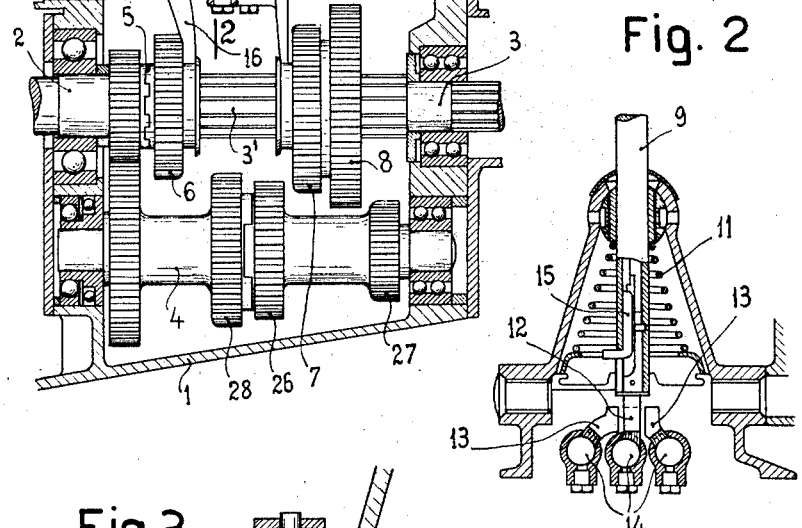
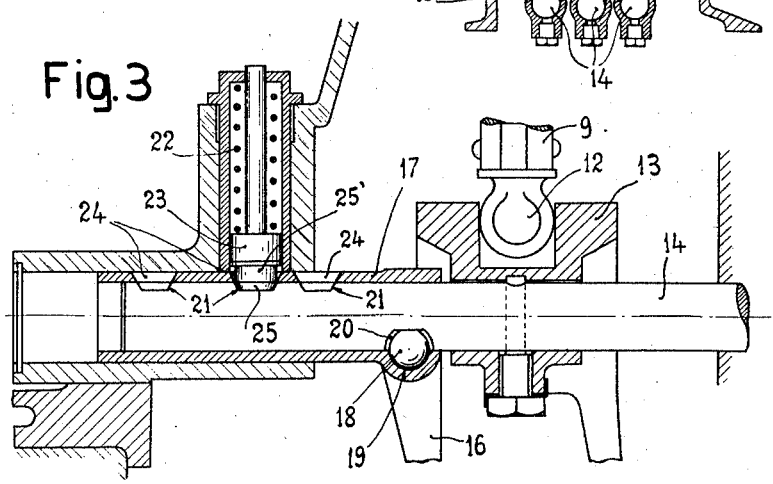
Inventor:
Vittorio Valletta
By
Attorney.

Patented July 2, 1929.

1,719,032

UNITED STATES PATENT OFFICE.

VITTORIO VALLETTA, OF TURIN, ITALY, ASSIGNOR TO FIAT SOCIETA ANONIMA, OF TURIN, ITALY, A CORPORATION OF ITALY.

CHANGE-SPEED GEAR.

Application filed April 19, 1928, Serial No. 271,279, and in Italy April 28, 1927.

The present invention has for its object a locking device for members shifting the movable pinion sets in pinion change speed gears for automotive vehicles and the like.

In accordance with this invention the motion is imparted by actuating means to a part carrying a pinion-set shifting fork, with the cooperation of an intermediate member which has a lost motion with respect to said part, and the locking action is produced by a spring operated plunger adapted to engage both said intermediate member and fork carrying part, said plunger being adapted to be made inoperative under an action exerted on said intermediate member while it cannot be released under an action operative on said pinion-set shifting fork or on the part carrying it.

In the annexed drawing is illustrated by way of example an embodiment of the present invention, and Figure 1 thereof is a fragmentary longitudinal section of a change speed gear provided with the present invention;

Figure 2 is a transverse section of the top portion of the change speed gear box in which the actuating lever is mounted, said section being taken on line 2—2 of Fig. 1;

Figure 3 shows separately the fork locking device on an enlarged scale.

The change speed gear comprises as usual a box 1 in which are mounted a driving shaft 2, a driven shaft 3 and a countershaft 4.

On said driven shaft 3 are mounted to move a direct drive dog clutch 5 which is rigidly connected to pinion 6 and a riding set of pinions 7—8, said pinions being intended to mesh respectively with the corresponding pinions 26—27 of the countershaft 4. The pinion 28 is intended to be engaged by pinion 6. Pinions 6 and 7—8 have a unitary rotation and are movable longitudinally on the splined portion 3' of the driven shaft 3.

Pinions 6 and 7—8 are controlled by means of a control lever 9 mounted to float by a ball support 10 and a spring 11 in the cover 29 of the change speed gear box; the bottom head 12 of said lever 9 being adapted to be carried into selective engagement with the seats 13 of three control rods 14. The lever 9 has a stop 15 actuated as usual by a handle on the manipulating lever 9 and adapted to prevent undue motion of said lever. These parts are not described and illustrated in detail as they are well known in the art.

In accordance with the present invention the pinion shifting fork 16 (see Figure 3) intended to actuate a movable pinion or pinion set, instead of being directly fastened on the respective rod 14, is carried by a sleeve 17 mounted to slide on rod 14 and engaged therewith with lost motion in longitudinal direction by a ball 18 located in a seat 19 in sleeve 17 and in an elongated recess 20 provided in the rod 14 and elongated in longitudinal direction.

In rod 14 are provided frusto-conical notches 21 registering with tapering or bevel-edge holes 24 provided in sleeve 17, and each of the notches 21 and cooperating hole 24 provide a seat for a locking member consisting of a plunger 23 acted on by a spring 22, said plunger having a frusto conical end portion 25 intended to enter one of the notches 21 and a cylindrical portion 25' intended to engage the hole 24.

When the movable pinion set actuated by the fork 16 is in one of its operative positions, the head 25—25' of plunger 23 engages one of the recesses provided by a pair of cooperating holes 24 and notches 21, while the ball 18 is in the middle portion of its elongated seat 20 in rod 14.

In this position of the parts, as shown in Figure 3, a longitudinal action produced on fork 16 and sleeve 17 cannot cause said sleeve and fork to move because the bevel edge of hole 24 engages the cylindrical or abrupt portion 25' of the plunger head, and said bevel edge has no action on the plunger; on the contrary when lever 9 is manipulated, said lever shifts rod 14, which may move with respect to sleeve 17 owing to the lost-motion interconnection provided by ball 18 and seat 20, and the bevel surface of its notch 21 acts to displace plunger 23 by acting on its bevel end 25.

Thereafter the bevel end 25 of plunger 23 is in front of the bevel edge of hole 24 of sleeve 17 and it may be shifted under the action produced on sleeve 17 by rod 14 and its manipulating means.

Thus owing to the described arrangement the control means firstly move the rod 14 owing to its lost motion with respect to sleeve 17 which is locked by the plunger, and then they put the said plunger in condition for being entirely released under the action produced thereon by sleeve 17 through its bevel-edge hole, when said sleeve is shifted by the rod 14 and manipulating means after the lost-motion connection has been carried into driving condition.

When a new operative position is reached by the parts, plunger 23 snaps again in registering hole 24 of the sleeve 17 and the notch 21 in rod 14, which parts 21—24 come into the register with it, under the action of its spring 22, thus locking the parts in correct registering position.

What I claim as my invention and desire to secure by United States Letters Patent is:—

1. A locking device for movable pinion sets in change speed gears, comprising a pinion-set shifting member, a part connected with lost-motion with said member, means for actuating said lost-motion part, registering sloping means in said shifting member and lost-motion part, and a locking member engaging said sloping means and having a sloping surface in register with the sloping means of said lost-motion part and an abrupt surface in register with the sloping means of said shifting member.

2. A locking device for movable pinion sets in change speed gears, comprising a pinion-set shifting member, a part adjacent to said member, said adjacent part and shifting member constituting companion elements, a lost-motion connecting part rigid with one of said companion elements and engaged in an elongated recess of the other one, means for actuating said lost-motion part, registering sloping means in said shifting member and lost-motion part, and a locking member engaging said sloping means and having a sloping surface in register with the sloping means of the lost-motion part and an abrupt surface in register with the sloping means of said shifting member.

3. A locking device for movable pinion sets in change speed gears, comprising a sleeve mounted to reciprocate in the change speed gear box, a pinion set shifting fork connected with said sleeve, a rod extending into said sleeve, means providing a lost-motion interconnection between said rod and sleeve, said rod having tapering notches in its surface and said sleeve having bevel-edge holes in its wall in register with said rod notches, a plunger mounted to move transversely to said rod and sleeve, and a snap spring acting on said plunger, said plunger having a tapering head engaging the tapering rod notches and an abrupt surface lying in front of the bevel edge of the sleeve holes when said tapering head is seated home in said rod notches.

In testimony whereof I affix my signature.

VITTORIO VALLETTA.